(12) United States Patent
Flohr

(10) Patent No.: US 10,733,040 B2
(45) Date of Patent: Aug. 4, 2020

(54) INDIVIDUAL BUG FIXED MESSAGES FOR SOFTWARE USERS

(71) Applicant: FARO Technologies, Inc., Lake Mary, FL (US)

(72) Inventor: Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 266 days.

(21) Appl. No.: 15/886,214

(22) Filed: Feb. 1, 2018

(65) Prior Publication Data
US 2019/0235942 A1    Aug. 1, 2019

(51) Int. Cl.
| | | |
|---|---|---|
| G06F 11/00 | (2006.01) | |
| G06F 11/07 | (2006.01) | |
| G06F 8/65 | (2018.01) | |
| G06F 11/36 | (2006.01) | |

(52) U.S. Cl.
CPC .............. *G06F 11/079* (2013.01); *G06F 8/65* (2013.01); *G06F 11/0709* (2013.01); *G06F 11/0766* (2013.01); *G06F 11/0778* (2013.01); *G06F 11/0787* (2013.01); *G06F 11/366* (2013.01); *G06F 11/0793* (2013.01)

(58) Field of Classification Search
CPC .... G06F 8/65; G06F 11/0709; G06F 11/0766; G06F 11/0778; G06F 11/0787; G06F 11/079; G06F 11/0793; G06F 11/366
See application file for complete search history.

(56) References Cited

U.S. PATENT DOCUMENTS

| | | | | |
|---|---|---|---|---|
| 6,708,333 | B1* | 3/2004 | Glerum | G06F 11/0748 707/999.2 |
| 7,158,965 | B1* | 1/2007 | Greenberg | G06F 9/453 |
| 8,151,248 | B1* | 4/2012 | Butler | G06F 11/3692 717/124 |
| 8,705,012 | B2 | 4/2014 | Greiner et al. | |
| 8,875,120 | B2 | 10/2014 | Venkatesan et al. | |
| 9,542,300 | B1* | 1/2017 | Massicotte | G06F 11/3466 |
| 10,394,690 | B1* | 8/2019 | Potter | G06F 8/38 |

(Continued)

FOREIGN PATENT DOCUMENTS

WO    2011146750 A2    11/2011

OTHER PUBLICATIONS

European Search Report for Application No. 19154152.3-1224 dated Aug. 1, 2019, 7 pages.

*Primary Examiner* — Joshua P Lottich
(74) *Attorney, Agent, or Firm* — Cantor Colburn LLP

(57) ABSTRACT

Individual bug fixed messages for software users that includes determining an occurrence of an error in software executing on a user processor. A unique error report identifier is stored in a memory accessible by the user processor and the error is reported. The reporting includes transmitting the unique error report identifier and error data that describes the error to a developer server. The error data is analyzed to determine a fix to correct the error. A message regarding the fix to correct the error is stored in a fixed error database. The software is launched and it is determined that the error was previously reported. The fixed error database is queried by the software with the unique error report identifier to locate the message. Based on locating the message, the message is downloaded and displayed by the user processor.

17 Claims, 9 Drawing Sheets

(56) References Cited

U.S. PATENT DOCUMENTS

| | | | |
|---|---|---|---|
| 2004/0107387 A1* | 6/2004 | Larsson | G06F 11/0775 |
| | | | 714/39 |
| 2005/0138111 A1* | 6/2005 | Aton | G06F 11/3476 |
| | | | 709/201 |
| 2006/0156077 A1* | 7/2006 | Altaf | G06F 11/0775 |
| | | | 714/57 |
| 2007/0214396 A1 | 9/2007 | McKeogh et al. | |
| 2010/0205583 A1 | 8/2010 | Gebhardt et al. | |
| 2015/0193296 A1* | 7/2015 | Chen | G06F 11/079 |
| | | | 714/15 |
| 2016/0041866 A1* | 2/2016 | Oleynikov | G06F 16/9535 |
| | | | 714/15 |
| 2017/0139767 A1* | 5/2017 | Cain | G06F 11/0751 |
| 2018/0004507 A1* | 1/2018 | Aijaz | G06F 8/71 |
| 2018/0074884 A1* | 3/2018 | Cady | G06F 11/0787 |
| 2019/0102243 A1* | 4/2019 | Thompson | G06F 11/0772 |
| 2019/0121717 A1* | 4/2019 | Francis | G06F 11/0793 |

* cited by examiner

INDIVIDUAL BUG FIXED MESSAGES FOR SOFTWARE USERS

BACKGROUND

The subject matter described herein relates in general to reporting errors in software, and in particular to providing individual bug fixed messages for software users.

Software applications that are tested by product developers can still experience errors when used by customers. This can be due to differences between testing and customer operating environments which can vary widely between customers. Some errors are only experienced by a subset of the software users and other errors are more widespread. Product developers generally encourage customers to report any software errors that they experience so that the problem can be analyzed and corrected via a software update, patch or work-around. The reporting of software errors can be supplemented by data such as memory dumps to aid the software developers in their analysis of the problem. A memory dump, also referred to as a core dump or system dump, includes a recorded state of the working memory of a computer program at a specific time such as when the program has crashed or otherwise terminated abnormally.

Software applications can include scan processing software that is executed on metrology devices, such as 3D laser scanner time-of-flight (TOF) coordinate measurement devices to generate three-dimensional (3D) representations of areas, such as buildings for example. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable software executing on a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data, referred to herein as a point cloud (or point cloud data), is collected, stored and sent to a processor or processors to generate a 3D image representing the scanned area or object.

When software, such as scan software for example, terminates unexpectedly, contents of the error report and memory dump may contain data that is private to the customer but still important to analyzing the software error that caused the unexpected termination. In order to facilitate analyzing the software error, the contents of the error report and memory dump can be modified to remove identifying information so that the customer reporting the error cannot be identified. This may include for example, removing the email address that the error report was received from. This process of anonymizing the data removes the link between the customer reporting the software error and the error being reported and there is no way to directly report back to the customer that the error that the customer reported has been corrected. A customer reporting an error can review documentation associated with fixes, or patches, and/or new software versions that are communicated to all users of the software to see if it appears that the problem that they reported has been corrected.

Accordingly, while processes for reporting errors in software are suitable for their intended purposes, what is needed is a process for reporting software errors having certain features of embodiments of the present invention.

BRIEF DESCRIPTION

According to an embodiment of the present invention, a method for providing individual bug fixed messages for software users is provided. The method includes determining an occurrence of an error in software executing on a user processor. A unique error report identifier is stored in a memory accessible by the user processor and the error is reported. The reporting includes transmitting the unique error report identifier and error data that describes the error to a developer server. The error data is analyzed to determine a fix to correct the error. A message regarding the fix to correct the error is stored in a fixed error database. The software is launched and it is determined that the error was previously reported. The fixed error database is queried by the software with the unique error report identifier to locate the message. Based on locating the message, the message is downloaded and displayed by the user processor.

According to an embodiment of the present invention, a method for providing individual bug fixed messages for software users includes determining an occurrence of an error in software executing on a user processor. A unique error report identifier is stored in a memory accessible by the user processor and the error is reported. The reporting includes transmitting the unique error report identifier and error data that describes the error to a developer server. The software is launched and it is determined that the error was previously reported. A fixed error database is queried by the user processor with the unique error report identifier to locate a message regarding a fix to correct the error. Based on locating the message, the message is downloaded and displayed by the user processor.

According to an embodiment of the present invention, a method for providing individual bug fixed messages for software users includes receiving an error report at a developer server from a user processor executing software. The error report includes a unique error report identifier and error data that describes an error in the software. The error data is analyzed to determine a fix to correct the error. A message regarding the fix to correct the error and the unique error report identifier are stored in a fixed error database. The message is accessible by the user processor in response to a query from the user processor that specifies the unique error report identifier.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
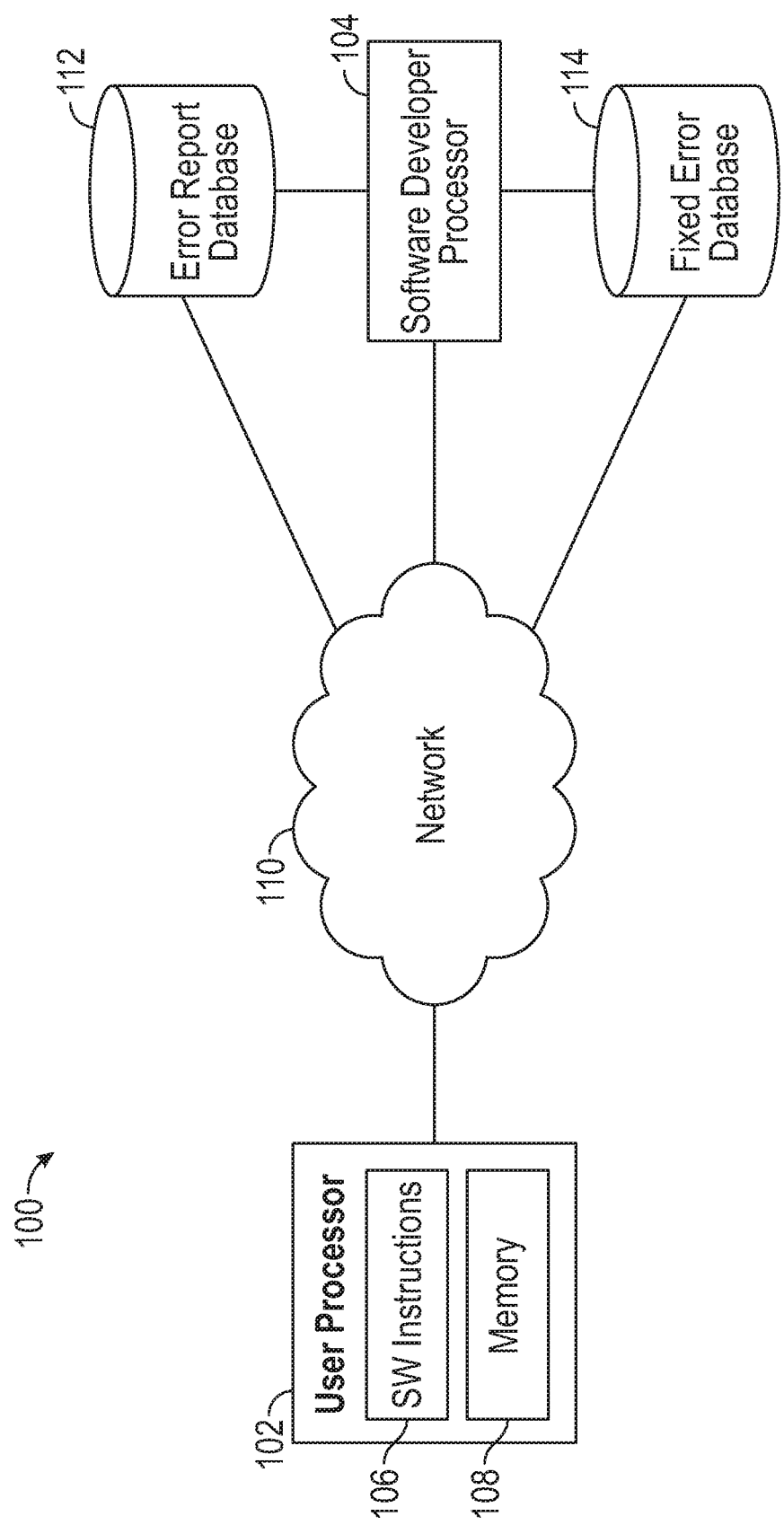
FIG. 1 is a schematic illustration of a system for providing individual bug fixed messages for software users in accordance with one or more embodiments of the present invention.

The detailed description explains embodiments of the invention, together with advantages and features, by way of example with reference to the drawings.

DETAILED DESCRIPTION

Embodiments of the present invention relate to reporting software errors and providing feedback to individual customers when a reported software error is fixed, for example in an updated version of the software. In accordance with one or more embodiments of the present invention, individual messages describing the fix can be retrieved by a single software user who reported the problem or by a group of users who reported the problem. The terms "user" and "customer" are used interchangeably herein to refer to someone who is using the software to perform tasks.

It is desirable for software customers to report software errors, such as software crashes, to developers of the software so that the errors can be analyzed and corrected. For reported software errors that are determined to be defects, updated application code can be provided to the software users as patches and/or incorporated in new software versions. Information, for example in the form of memory dumps, about the state of the system and/or software when the error was encountered can be useful to the developers when they analyze a reported software error to find the root cause of the software error and to create a fix if required. For data protection reasons, the information provided by the user can be anonymized to remove any data identifying the customer reporting the error such as, but not limited to the email address of the customer reporting the error. In contemporary problem reporting systems, when the data is anonymized the link that connects the software error being reported and the customer reporting the software error is removed and thus, direct communication between the software developer and the customer regarding the error is no longer possible. In contemporary systems, customers reporting the software error review documentation provided by the software developer that is associated with fixes, or patches, and/or new software versions to determine whether the problem that they reported appears to have been corrected. In addition, a generic message to all users of the software product can be sent to describe one or more solutions, or fixes, to identified software errors.

In accordance with one or more embodiments of the present invention, individual messages can be provided to customers who send in software error reports. The messages can be used to inform a customer about a fix for a software problem that was reported by the customer. In accordance with one or more embodiments of the present invention, when a software error, such as a software crash, occurs a unique error report identifier such as a session identifier is stored on the hard drive of the user. If the customer sends in an error report to the software developer, the session identifier is associated with the error report and also sent to the software developer along with the error report. Both the session identifier and an anonymized version of the error report as well as error information (e.g., memory dump at the time of the software crash, operating system version, available memory, central processing unit model, graphics processing unit model, driver versions, and other hardware configuration information) can be stored in an error report database accessible by the software developer. After the reported software error is fixed by the software developer and an updated version is available for download by the customers, a message to the customer who reported the software error, as well as the session identifier(s) associated with the error report, are stored in a fixed error database. The customer can retrieve the message based on the session identifier.

More than one session identifier can be associated with the message as more than one customer could have reported the same software error. In an embodiment, multiple core dumps are compared to find similarities that indicate that they are related to the same software error. The comparisons can be performed in an automated fashion using heuristics and/or deep learning methods for example. In an embodiment, the system identifies new incoming core dumps that are related to a problem that was already fixed and the system adds the session identifier, or report identifier, to the message associated with that problem. In this manner, a hint can be displayed for the user without any manual intervention that a newer version of the software does not have the problem anymore.

In accordance with one or more embodiments of the present invention, when the customer starts up, or launches, the software and a network (e.g., Internet) connection has been established, the software identifies locally stored session identifiers that corresponding to software error reports and queries the fixed error database for the locally stored session identifiers. If a locally stored session identifier is contained in the fixed error database, then the software retrieves a message associated with the locally stored session identifier. The software can then display the message to the user. The message can include information about how to download a fix to the reported problem and/or information describing a work around to the reported problem.

Embodiments of the present invention provide advantages over contemporary methods by providing the ability to notify a customer that a software problem that the customer reported to a software developer has been fixed. This way, all users who reported a software problem will be notified via a message when the problem that they reported was fixed. Other users, that is, those who did not report the software problem, will not see this message. The message can thank the customer for reporting the problem and give information about the fix to the problem. The ability to display individual messages for customers who took the time to send in error reports including error information provides advantages in improving the customer relationship, especially with customers that are dissatisfied that the problem occurred.

Turning now to FIG. 1, a schematic illustration of a system 100 for providing individual bug fixed messages for software users is generally shown in accordance with one or more embodiments of the present invention. The system 100 shown in FIG. 1 includes a user processor 102 with software instructions 106 for execution by the user processor 102 to implement a software program and a memory 108 for storing unique error report identifiers, such as session identifiers, associated with software errors reported by the customer, or software user. The memory 108 in the embodiment shown in FIG. 1 is part of the user processor 102, however in other embodiments the memory 108 is a storage device external to the user processor 102.

The user processor 102 is communicatively coupled to network 110. The system 100 shown in FIG. 1 also includes a software developer processor 104, an error report database 112, and a fixed error database 114 all communicatively coupled to the network 110. The error report database 112 shown in FIG. 1 includes data about errors that have been reported to the software developers. In accordance with one or more embodiments the data stored in the error report database 112 includes, for each reported error, a unique error report identifier, an error report, and additional error information.

In accordance with one or more embodiments of the present invention, an error report identifier (e.g., a session identifier), an anonymized version of the error report, and an anonymized version of the error information from the user processor 102 are received from the user processor 102 and stored directly into the error report database 112 and/or stored into the error report database 112 via computer instructions located on the software developer processor 104. An anonymized version of the error report and the error information can be created by the software instructions 106 located on the user processor 102 to remove any references or possible identifiers of the customer reporting the problem. For example, the customer name and physical location may be modified or removed from the error report and error information prior to sending them to a software developer at the software developer processor 104. In addition, the email address of the sender can be removed as it is no longer needed to submit the data. Further, information in the core dump such a loaded project name, path on disk, etc. can be removed. In an embodiment, initially only the email address is removed as the information in the core dump is typically in binary format and needs to be loaded in order to be modified. Often times the core dump does not contain any security relevant information. In an alternate embodiment, the references or possible identifiers of the customer reporting the problem are removed by software instructions located on the software developer processor 104 prior to storing the error report identifier, error report, and error information in the error report database 112.

Software developers analyze the reported software error and determine a fix or work-around to the software error. Once a fix is determined, the error report identifier and a message to the customer who reported the error are stored in the fixed error database 114. The fixed error database 114 shown in FIG. 1 includes data that ties or associates a message (e.g. text based data) about a software fix to a customer who reported the software error being fixed. This link is needed to provide messages to customers who reported software errors because the error report and error information have modified to remove references that identify the customer. In accordance with one or more embodiments of the present invention, the data stored in the fixed error database 114 is accessed, or queried, by a customer at a user processor 102 based on the unique error report identifier which uniquely identifies a reported software error. When a match occurs between the error report identifier in the customer query and an error report identifier in the fixed error database 114, the software error associated with the error report identifier has been fixed and the customer can retrieve the message associated with the error report identifier from the fixed error database 114 to learn more about how to implement the fix. The data stored in the fixed error database 114 can include, for each reported software error that has been fixed, the error report identifier and a message to the user who reported the error. The message can include a thank you to the customer for reporting the error, a status of the error as being fixed, a description of how to download a software patch or new software version to fix the reported error, and/or a description of a work-around to avoid the software error while running the software.

Error reports and fixed error messages can be stored in any known type of memory or storage device and in any known format and are not limited to being stored in databases as shown in FIG. 1. In addition, the error report database 112 and the fixed error database 114 can be implemented as a single database. Further, each of the report database 112 and the fixed error database 114 can be implemented as a plurality of databases.

The network 110 shown in FIG. 1 can include one or more of any type of known networks including, but not limited to, a wide area network (WAN), a local area network (LAN), a global network (e.g. Internet), a virtual private network (VPN), and an intranet. The network 110 can include a private network in which access thereto is restricted to authorized members. The network 110 can be implemented using wireless networking technologies or any kind of physical network implementation known in the art. The components shown in FIG. 1 may be coupled to one or more other components through multiple networks (e.g., Internet, intranet, and private network) so that not all components are coupled to other components through the same network 110.

Figure 2:
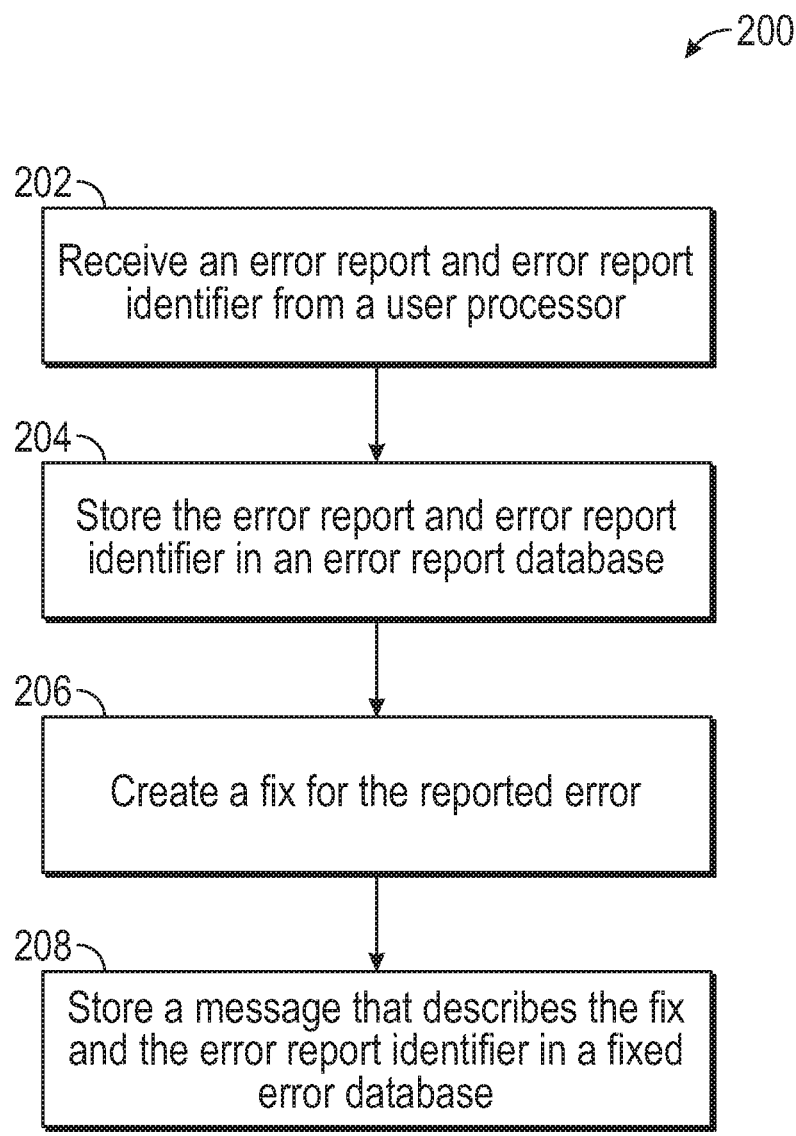
FIG. 2 is a flow diagram illustrating a method of a software developer providing individual bug fixed messages in accordance with one or more embodiments of the present invention.

Turning now to FIG. 2, a flow diagram 200 illustrating a method of a software developer providing individual bug fixed messages is generally shown in accordance with one or more embodiments of the present invention. In an embodiment, the processing shown in FIG. 2 is performed by computer instructions executing on the software developer processor 104 shown in FIG. 1. At block 202, an error report and an error report identifier are received, via a network such as network 110 of FIG. 1, from a customer at a user processor that is executing the software that has crashed. The error report identifier can be assigned by the software instructions executing on the user processor and can include any unique identifier that uniquely identifies the software error being reported such as, but not limited to a session identifier of the session that was in process on the user processor 102 when the software error was detected. In an embodiment, the session ID is a unique number or token automatically assigned by the operating system executing on the user processor 102. The session ID can be created locally without connection to the server. In an embodiment, the session ID is a universally unique identifier (UUID), also referred to as a globally unique identifier (GUID), which makes it very unlikely that two session IDs will be the same In an embodiment, a UUID generator provided for example, by the Windows® application programming interface(API) from Microsoft, is utilized to generate the session IDs. In addition to the error report identifier and the error report, error information that can aid the software developers in analyzing the error can also be received from the customer. As described previously, both the error report and the error information can be anonymized.

At block 204 of FIG. 2, the error report and the error report identifier are stored in an error report database, such as error report database 112 of FIG. 1. At block 206 software developers, using a software developer processor such as software developer processor 104 of FIG. 1, analyze the error report and/or error information to determine a fix for the reported error. The software developer can then implement the fix. The fix can include but is not limited to: a patch to an existing version of the software; a new version of the software; and/or a description of a suggested work-around to avoid the software error. As used herein, the term "software developer" is used to describe computer programmers or analysts that are familiar with the software application that is the subject of the error reports, who can analyze and debug the reported error, and can update the software instructions if necessary to implement a fix to correct the error. At block 208, a message that describes the fix is stored in a fixed error database which is accessible by a customer.

Figure 3:
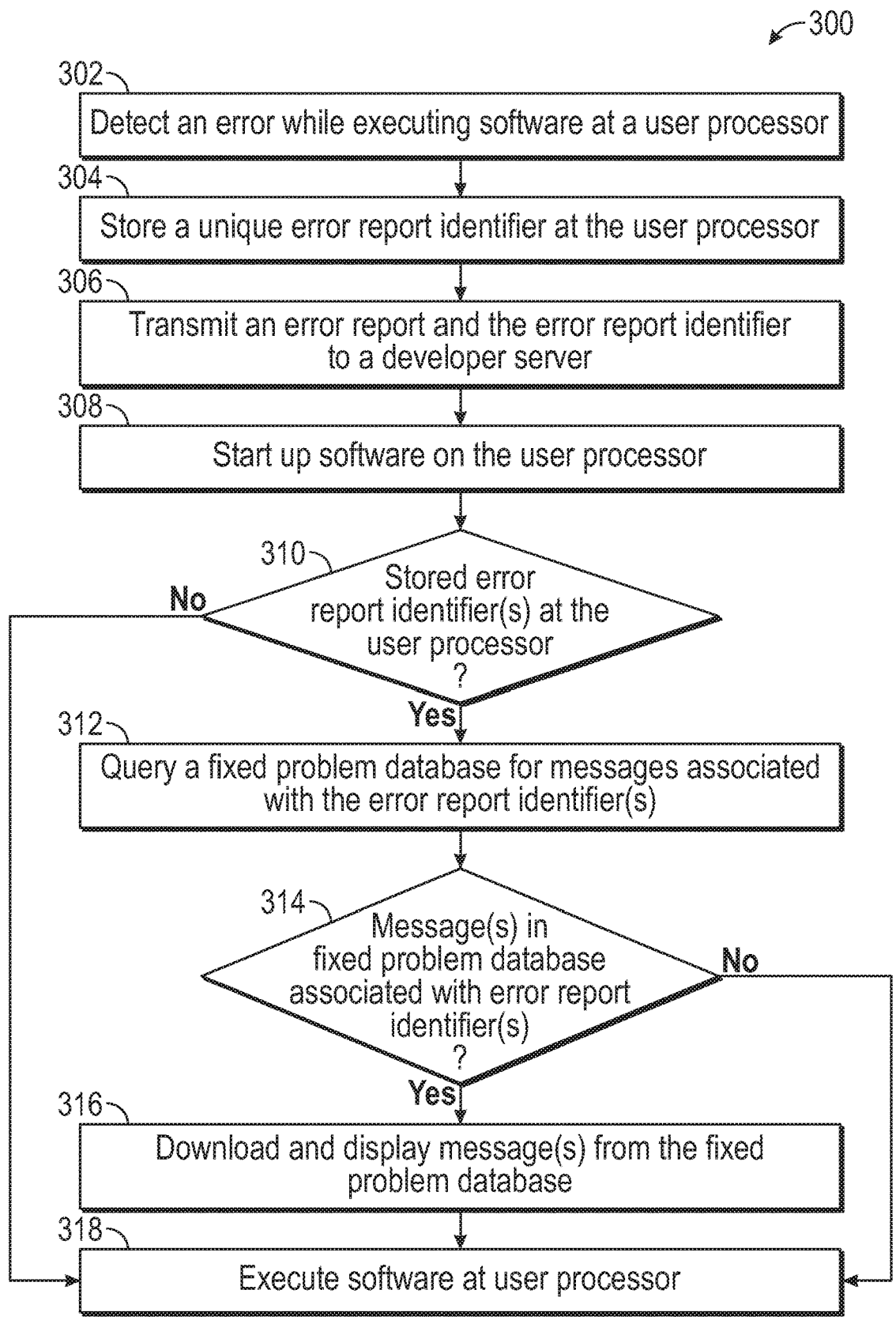
FIG. 3 is a flow diagram illustrating a method of a software user reporting errors and retrieving individual bug fixed messages in accordance with one or more embodiments of the present invention.

Turning now to FIG. 3, a flow diagram 300 illustrating a method of a software user reporting errors and retrieving individual bug fixed messages is generally shown in accordance with one or more embodiments of the present invention. In an embodiment, the processing shown in FIG. 3 is performed by the software instructions 106 executing on the user processor 102 shown in FIG. 1. At block 302, a customer executing software on a user processor detects an error in the software, and at block 304 the customer stores a unique error report identifier in a memory accessible by the user processor. An error report along with the error report identifier is transmitted to a developer server, such as software developer processor 104 of FIG. 1, at block 306. At some point after transmitting the error report, the customer starts up, or launches, the software at block 308. At block 310 the software accesses the memory accessible by the user processor to determine whether it contains any stored error report identifiers. If one or more stored error report identifiers are located then this indicates that a software error has previously been reported by the customer, and processing continues at block 312. If it is determined at block 310 that there are no stored error report identifiers, then processing continues at block 318 with the software executing to perform application functions (e.g., scan processing functions).

At block 312, after launching, the software queries a fixed problem database, such as fixed error database 114 of FIG. 1, to locate messages associated with the stored error report identifier(s). It is determined at block 314 whether a message in the fixed problem database corresponds to the stored error report identifier(s). If, as determined at block 314, no messages that correspond to the stored error report identifier(s) are found in the fixed problem database, then the reported errors have not been fixed and processing continues at block 318 with the software executing to perform application functions. If, as determined at block 314, a message corresponding to an error report identifier is found in the fixed problem database, then processing continues at block 316 with the software executing on the user processor downloading and displaying the message. Processing continues at block 318 with the software executing to perform application functions.

In one or more embodiments of the present invention, the messages in the fixed error database are used to provide a status (e.g., expected fix date) to customers about the reported error. The messages can also be used to request additional information or clarification from the customer to assist in debugging and correcting the error. The messages can also be used to provide an interim fix or to request the customer to try out a proposed fixed. The customer can provide additional information/feedback by updating the original error report or submitting a new error report with the same error report identifier. In this manner, by allowing the customer to pull messages based solely on the error report identifier(s) the customer reporting the error can remain anonymous while providing additional information/ feedback about a software defect to the software developers.

In accordance with one or more embodiments of the present invention, the software instructions 106 are implemented by scan processing software executing on a coordinate measurement device. The scan processing software can be SCENE™ software which is manufactured by FARO Technologies, Inc. of Lake Mary, Fla. SCENE software can be used to process and manage scan data efficiently and easily by using real time, on-site registration, automatic object recognition, scan registration, and positioning. Customers can use SCENE software to generate high-quality data in full color quickly and conveniently by incorporating images from automated targetless and target-based scan positioning.

Figure 4:
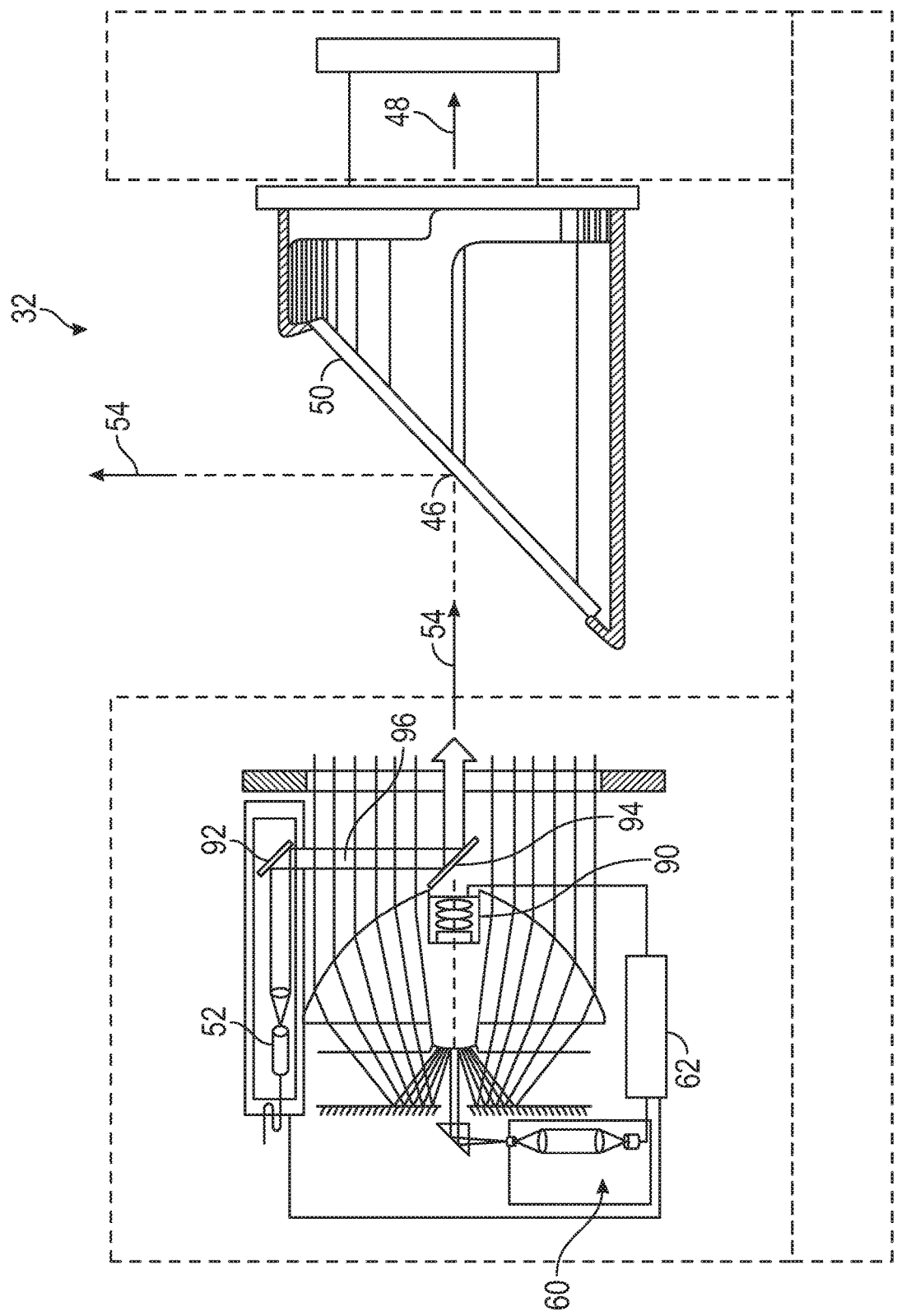
FIG. 4 is a partial side view of a laser scanner in accordance with one or more embodiments of the present invention.
Figure 5:
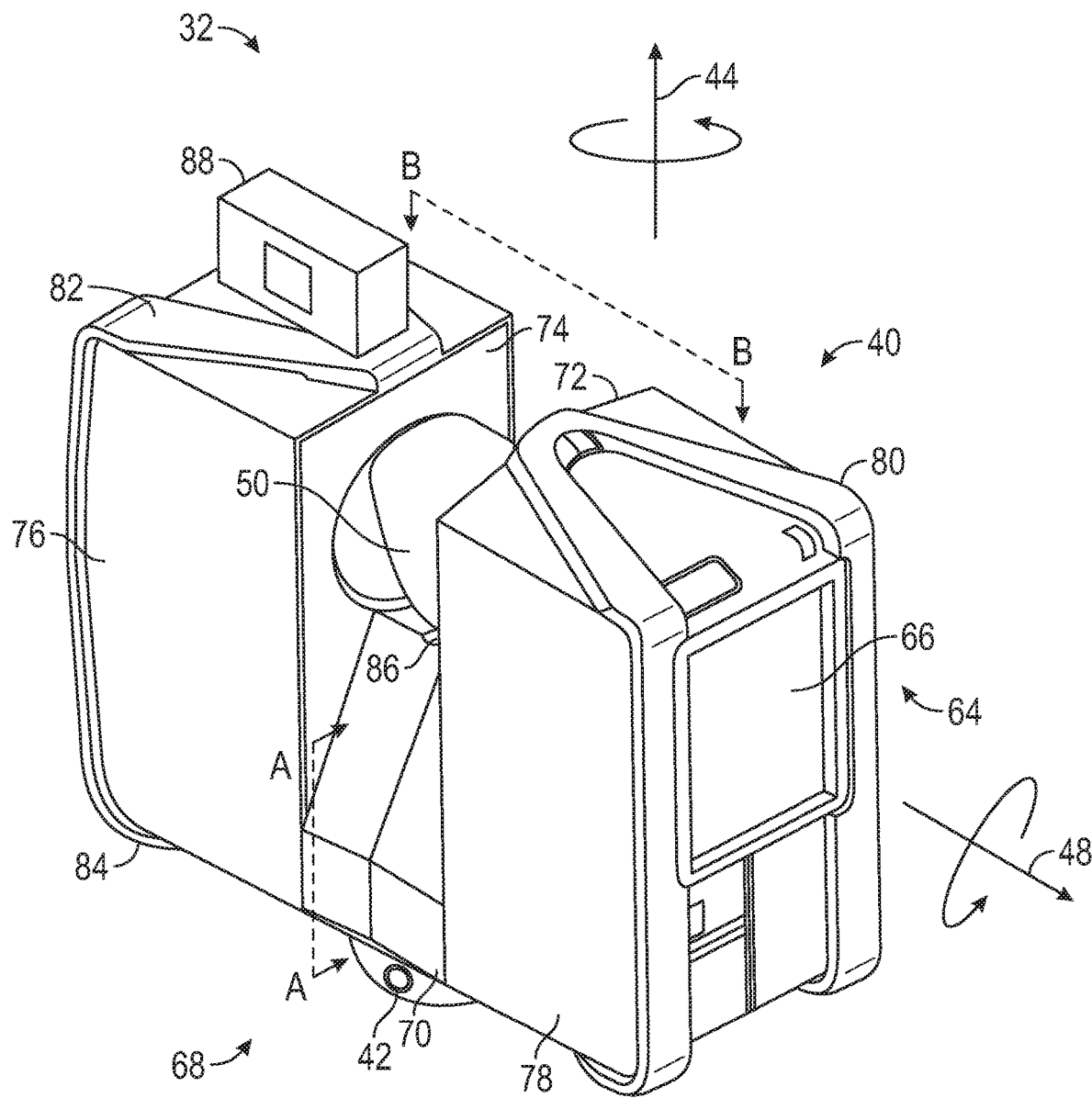
FIG. 5 is a perspective view of the laser scanner illustrating a method of measurement in accordance with one or more embodiments of the present invention
Figure 6:
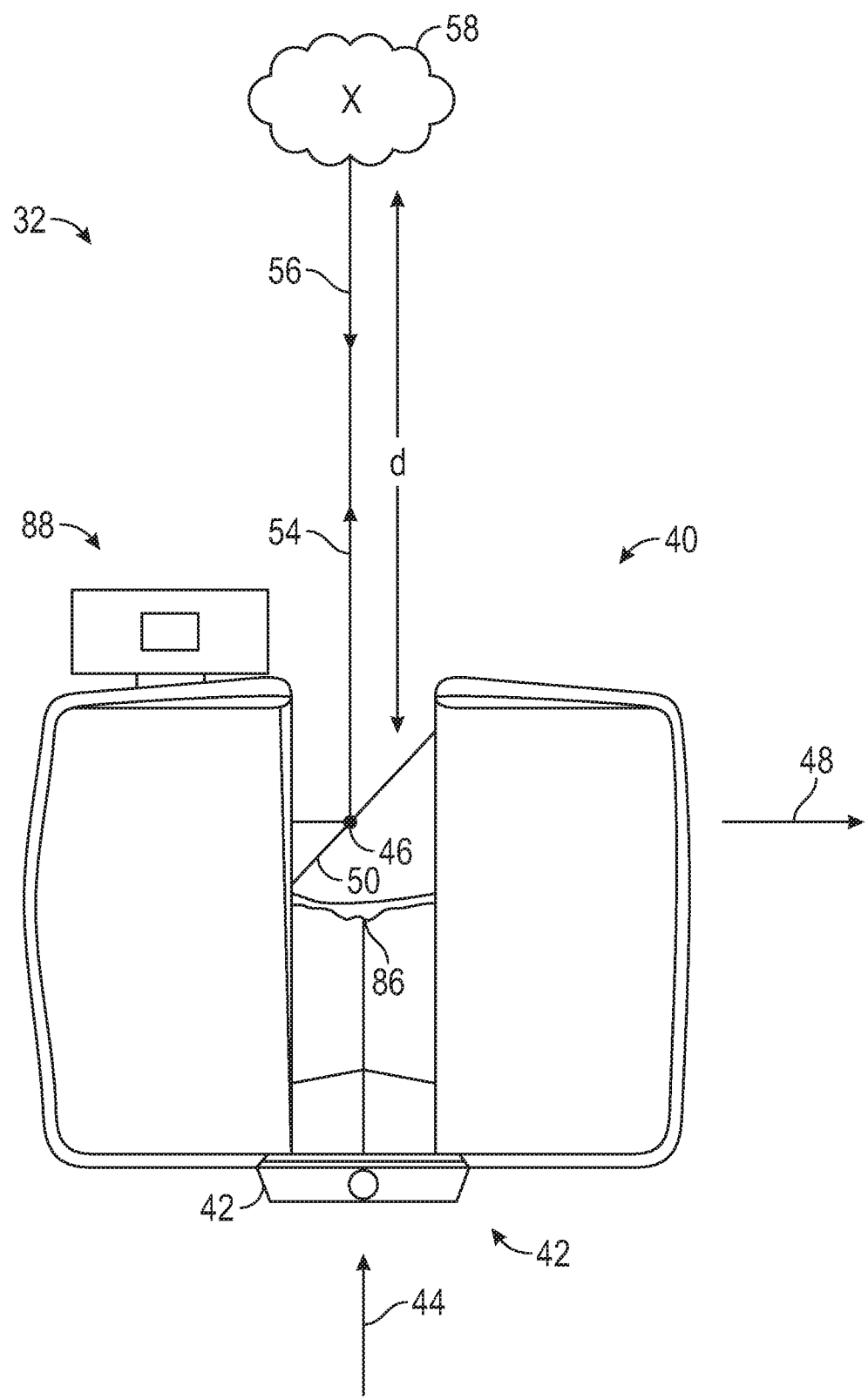
FIG. 6 is a schematic illustration partially in section along the line B-B of FIG. 5 of the optical, mechanical, and electrical components of the laser scanner in accordance with one or more embodiments of the present invention.

Referring now to FIGS. 4-6, an exemplary coordinate measurement device, laser scanner 32, is shown for optically scanning and measuring the environment in accordance with one or more embodiments of the present invention. The laser scanner 32 includes a processor for executing scan processing software to facilitate the scanning functions described herein. In one embodiment, the scan processing software is executed on a separate processing system (e.g. a desktop computer, a laptop or a tablet) that receives the 3D coordinate data from the laser scanner 32. The laser scanner 32 has a measuring head 40 and a base 42. The measuring head 40 is mounted on the base 42 such that the laser scanner 32 may be rotated about a vertical axis 44. In one embodiment, the measuring head 40 includes a gimbal point 46 that is a center of rotation about the vertical axis 44 and a horizontal axis 48. The measuring head 40 has a rotary mirror 50, which may be rotated about the horizontal axis 48. The rotation about the vertical axis may be about the center of the base 42. The terms vertical axis and horizontal axis refer to the scanner in its normal upright position. In other words, with the axis 44 extending approximately perpendicular to the floor or ground and the axis 48 being approximately parallel with the floor or ground. It should be appreciated that it is also possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative nomenclature for the vertical axis.

The measuring head 40 is further provided with an electromagnetic radiation emitter, such as light emitter 52, for example, that emits an emitted light beam 54. In one embodiment, the emitted light beam 54 is a coherent light beam such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emitted light beam 54 may be amplitude or intensity modulated, for example, with a sinusoidal waveform or with a rectangular waveform. The emitted light beam 54 is emitted by the light emitter 52 onto the rotary mirror 50, where it is deflected to the environment. A reflected light beam 56 is reflected from the environment by an object 58. The reflected or scattered light is intercepted by the rotary mirror 50 and directed into a light receiver 60. The directions of the emitted light beam 54 and the reflected light beam 56 result from the angular positions of the rotary mirror 50 and the measuring head 40 about the axes 44, 48 respectively. These angular positions in turn depend on the corresponding rotary drives or motors.

Coupled to the light emitter 52 and the light receiver 60 is a 3D scanner processor, or controller 62. The controller 62 determines, for a multitude of measuring points X, a corresponding number of distances d between the laser scanner 32 and the points X on object. The distance to a particular point X is determined (e.g., by a distance meter implemented by the controller 62) based at least in part on the speed of light in air through which electromagnetic radiation propagates from the device to the object point X. In one embodiment the phase shift of modulation in light emitted by the laser scanner 32 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the TOF of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air. In one embodiment, the method of triangulation is implemented by the scan processing software.

In one mode of operation, the scanning of the volume around the laser scanner 32 takes place by causing the rotary mirror 50 to rotate about axis 48 relatively quickly while rotating the measuring head 40 about axis 44 relatively slowly, thereby moving the assembly in a spiral pattern. In an exemplary embodiment, the rotary mirror rotates at a maximum speed of 5820 revolutions per minute. For such a scan, the gimbal point 46 defines the origin of the local stationary reference system. The base 42 rests in this local stationary reference system. In an embodiment, the operation of the laser scanner 32 is controlled by the scan processing software.

In addition to measuring a distance d from the gimbal point 46 to an object point X, the laser scanner 32 may also collect gray-scale information related to the received optical power (equivalent to the term "brightness.") The gray-scale value may be determined at least in part, for example, by integration of the bandpass-filtered and amplified signal in the light receiver 60 over a measuring period attributed to the object point X.

The measuring head 40 may include a display device 64 integrated into the laser scanner 32. The display device 64 may include a graphical touch screen 66, as shown in FIG. 5, which allows the operator to set the parameters or initiate the operation of the laser scanner 32. For example, the screen 66 may have a user interface that allows the operator to provide measurement instructions to the device, and the screen may also display measurement results. In addition, in one embodiment the display device 64 can display the messages retrieved from the fixed error database 114.

The laser scanner 32 includes a carrying structure 68 that provides a frame for the measuring head 40 and a platform for attaching the components of the laser scanner 32. In one embodiment, the carrying structure 68 is made from a metal such as aluminum. The carrying structure 68 includes a traverse member 70 having a pair of walls 72, 74 on opposing ends. The walls 72, 74 are parallel to each other and extend in a direction opposite the base 42. Shells 76, 78 are coupled to the walls 72, 74 and cover the components of the laser scanner 32. In the exemplary embodiment, the shells 76, 78 are made from a plastic material, such as polycarbonate or polyethylene for example. The shells 76, 78 cooperate with the walls 72, 74 to form a housing for the laser scanner 32.

On an end of the shells 76, 78 opposite the walls 72, 74 a pair of yokes 80, 82 are arranged to partially cover the respective shells 76, 78. In the exemplary embodiment, the yokes 80, 82 are made from a suitably durable material, such as aluminum for example, that assists in protecting the shells 76, 78 during transport and operation. The yokes 80, 82 each includes a first arm portion 84 that is coupled, such as with a fastener for example, to the traverse 70 adjacent the base 42. The arm portion 84 for each yoke 80, 82 extends from the traverse 70 obliquely to an outer corner of the respective shell 76, 78. From the outer corner of the shell, the yokes 80, 82 extend along the side edge of the shell to an opposite outer corner of the shell. Each yoke 80, 82 further includes a second arm portion that extends obliquely to the walls 72, 74. It should be appreciated that the yokes 80, 82 may be coupled to the traverse 70, the walls 72, 74 and the shells 76, 78 at multiple locations.

The pair of yokes 80, 82 cooperate to circumscribe a convex space within which the two shells 76, 78 are arranged. In the exemplary embodiment, the yokes 80, 82 cooperate to cover all of the outer edges of the shells 76, 78, while the top and bottom arm portions project over at least a portion of the top and bottom edges of the shells 76, 78. This provides advantages in protecting the shells 76, 78 and the measuring head 40 from damage during transportation and operation. In other embodiments, the yokes 80, 82 may include additional features, such as handles to facilitate the carrying of the laser scanner 32 or attachment points for accessories for example.

On top of the traverse 70, a prism 86 is provided. The prism 86 extends parallel to the walls 72, 74. In the exemplary embodiment, the prism 86 is integrally formed as part of the carrying structure 68. In other embodiments, the prism 86 is a separate component that is coupled to the traverse 70. When the mirror 50 rotates, during each rotation the mirror 50 directs the emitted light beam 54 onto the traverse 70 and the prism 86. Due to non-linearities in the electronic components, for example in the light receiver 60, the measured distances d may depend on signal strength, which may be measured in optical power entering the scanner or optical power entering optical detectors within the light receiver 56, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 60. Since the prism 86 is at a known distance from the gimbal point 46, the measured optical power level of light reflected by the prism 86 may be used to correct distance measurements for other measured points, thereby allowing for compensation to correct for the effects of environmental variables such as temperature. In the exemplary embodiment, the resulting correction of distance is performed by the controller 62.

In an embodiment, the controller 62 represents one or more processors distributed throughout the scanner 32 or external to the scanner 32 to execute scan processing software instructions to facilitate performing the functions described herein. The one or more processor may include one or more computing devices connected for communications via a network. The computing devices may be arranged in a distributed arrangement to operate cooperatively to process data from the scanner 32. The processors may be microprocessors, field programmable gate arrays (FPGAs), digital signal processors (DSPs), and generally any device capable of performing scan processing software computing functions. The one or more processors have access to memory (volatile or nonvolatile) for storing information. In addition, one or more of the processors of the controller 62 may provide support for remote computing capability. Communication between the processors may be through a wired, wireless, or a combination of wired and wireless data connection or medium.

In an embodiment, the base 42 is coupled to a swivel assembly (not shown) such as that described in commonly owned U.S. Pat. No. 8,705,012 ('012), which is incorporated by reference herein. The swivel assembly is housed within the carrying structure 68 and includes a motor that is configured to rotate the measurement head 40 about the axis 44.

An auxiliary image acquisition device 88 may be a device that captures and measures a parameter associated with the scanned volume or the scanned object and provides a signal representing the measured quantities over an image acquisition area. The auxiliary image acquisition device 88 may be, but is not limited to, a color camera, pyrometer, a thermal imager, an ionizing radiation detector, or a millimeter-wave detector.

In an embodiment, a camera (first image acquisition device) 90 is located internally to the scanner 32 and may have the same optical axis as the 3D scanner device. In this embodiment, the first image acquisition device 90 is integrated into the measuring head 40 and arranged to acquire images along the same optical pathway as emitted light beam 54 and reflected light beam 56. In this embodiment, the light from the light emitter 52 reflects off a fixed mirror 92 and travels to dichroic beam-splitter 94 that reflects the light 96 from the light emitter 52 onto the rotary mirror 50.

The dichroic beam-splitter 94 allows light to pass through at wavelengths different than the wavelength of light 96. For example, the light emitter 52 may be a near infrared laser light (for example, light at wavelengths of 780 nm or 1150 nm), with the dichroic beam-splitter 94 configured to reflect the infrared laser light while allowing visible light (e.g., wavelengths of 400 to 700 nm) to transmit through. In other embodiments, the determination of whether the light passes through the beam-splitter 94 or is reflected depends on the polarization of the light. The digital camera 90 acquires 2D photographic images of the scanned area to capture color data (texture) to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 44 and by steering the mirror 50 about the axis 48.

It should be appreciated that while embodiments herein describe a coordinate measurement device in reference to laser scanner 32, this is for exemplary purposes and the claims should not be so limited. In other embodiments, the scan processing software may be executed on, or receive data from, any coordinate measurement device capable of measuring and determining 3D coordinates of an object or the environment. The coordinate measurement device may be, but is not limited to: an articulated arm coordinate measurement machine, a laser tracker, a image scanner, a photogrammetry device, a triangulation scanner, a laser line probe, or a structured light scanner for example.

It is understood in advance that although this disclosure describes the reporting of software errors and providing feedback to customers who reported the software errors in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure made up of a network of interconnected nodes.

Figure 7:
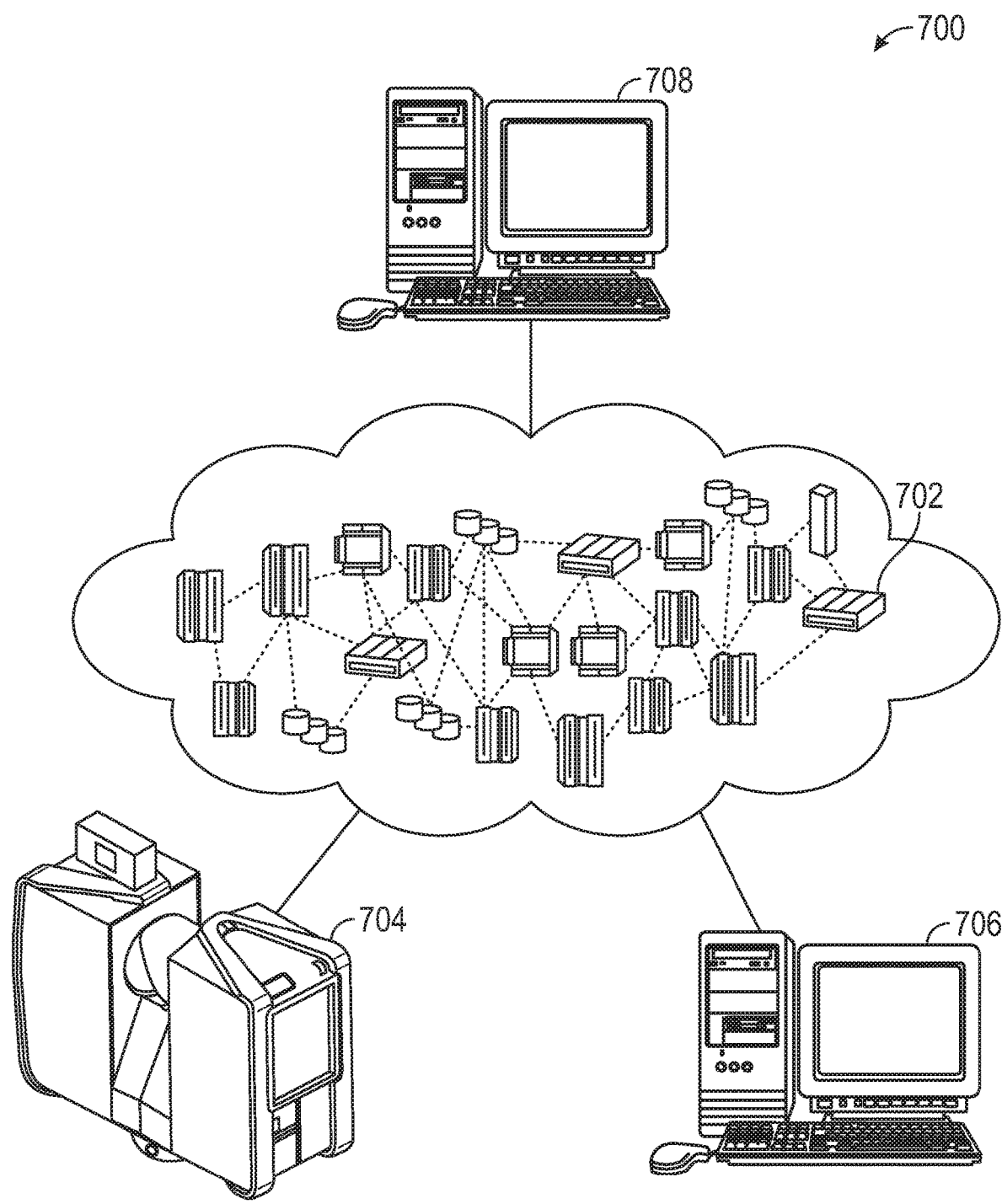
FIG. 7 is a schematic illustration of a cloud computing environment in accordance with one or more embodiments of the present invention.

Referring now to FIG. 7, an illustrative cloud computing environment 700 is depicted. As shown, cloud computing environment 700 comprises one or more cloud computing nodes 702 with which local computing devices used by cloud consumers, such as, for example, coordinate measurement device 704 and computers 706 708 may communicate. In an embodiment, the reporting of software errors and providing feedback to customers who reported the software errors is performed through the cooperation of computer 708 or 706, and the coordinate measurement device 704. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704-708 shown in FIG. 7 are intended to be illustrative only and that computing nodes 702 and cloud computing environment 700 can communicate with any type of computerized device over any type of network and/or network addressable connection (e.g., using a web browser).

Figure 8:
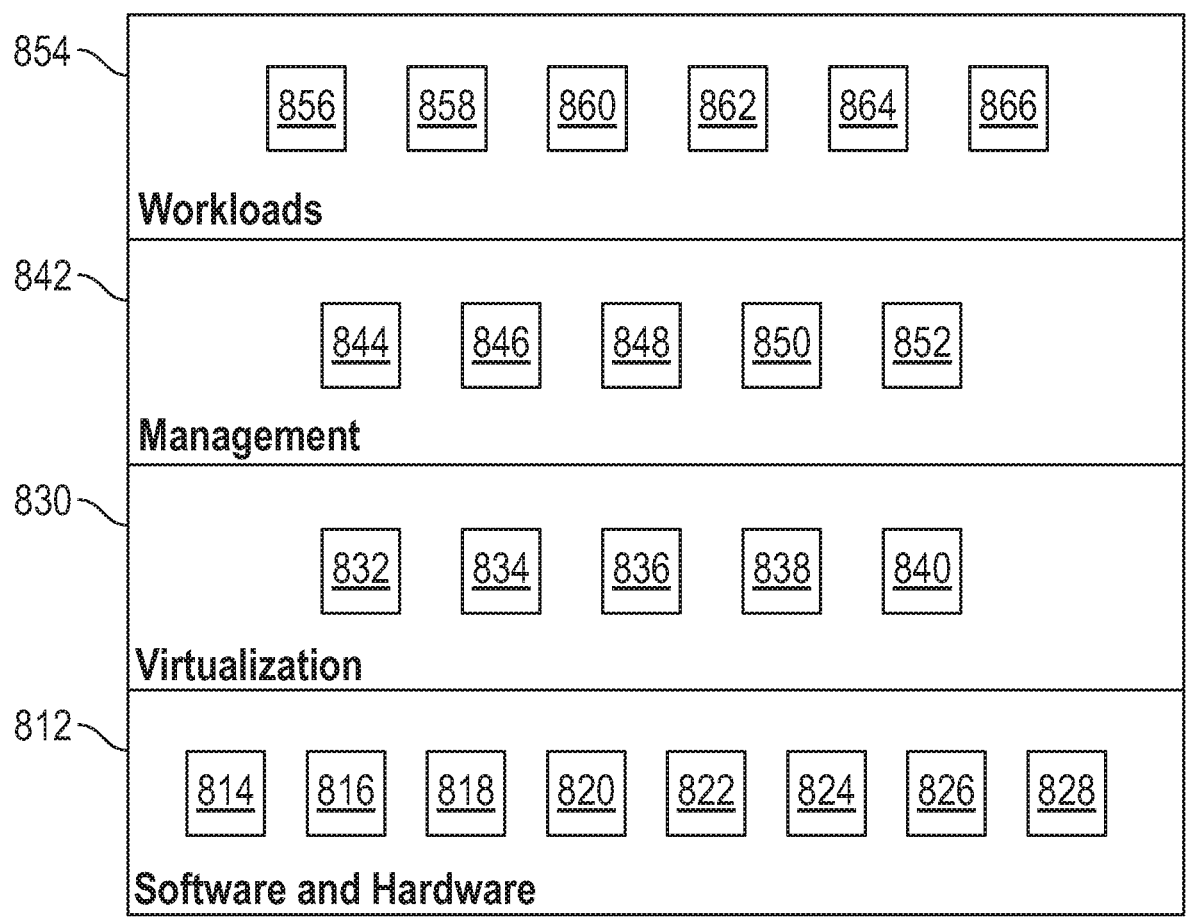
FIG. 8 is a schematic illustration of an abstraction model layers in accordance with one or more embodiments of the present invention.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided: hardware and software layer 812 includes hardware and software components. Examples of hardware components include: mainframes 814; RISC (Reduced Instruction Set Computer) architecture based servers 816; servers 818; blade servers 820; storage devices 822; and networks and networking components 824. In some embodiments, software components include network application server software 826, and database software 828; virtualization layer 830 provides an abstraction layer from which the following examples of virtual entities may be provided: virtual servers 832; virtual storage 834; virtual networks 836, including virtual private networks; virtual applications and operating systems 838; and virtual clients 840.

In one example, management layer 842 may provide the functions described below. Resource provisioning 844 provides dynamic procurement of computing resources and other resources that are utilized to perform tasks within the cloud computing environment. Metering and pricing 846 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 848 provides access to the cloud computing environment for consumers and system administrators. Service level management 850 provides cloud computing resource allocation and management such that required service levels are met. Service Level Agreement (SLA) planning and fulfillment 852 provides pre-arrangement for, and procurement of, cloud computing resources for which a future requirement is anticipated in accordance with an SLA.

Workloads layer 854 provides examples of functionality for which the cloud computing environment may be utilized. Examples of workloads and functions which may be provided from this layer include: mapping and navigation 856; software development and lifecycle management 858; transaction processing 860; scan processing software 862; point cloud to virtual reality data processing 864; and user defined content to point cloud processing 866.

Figure 9:
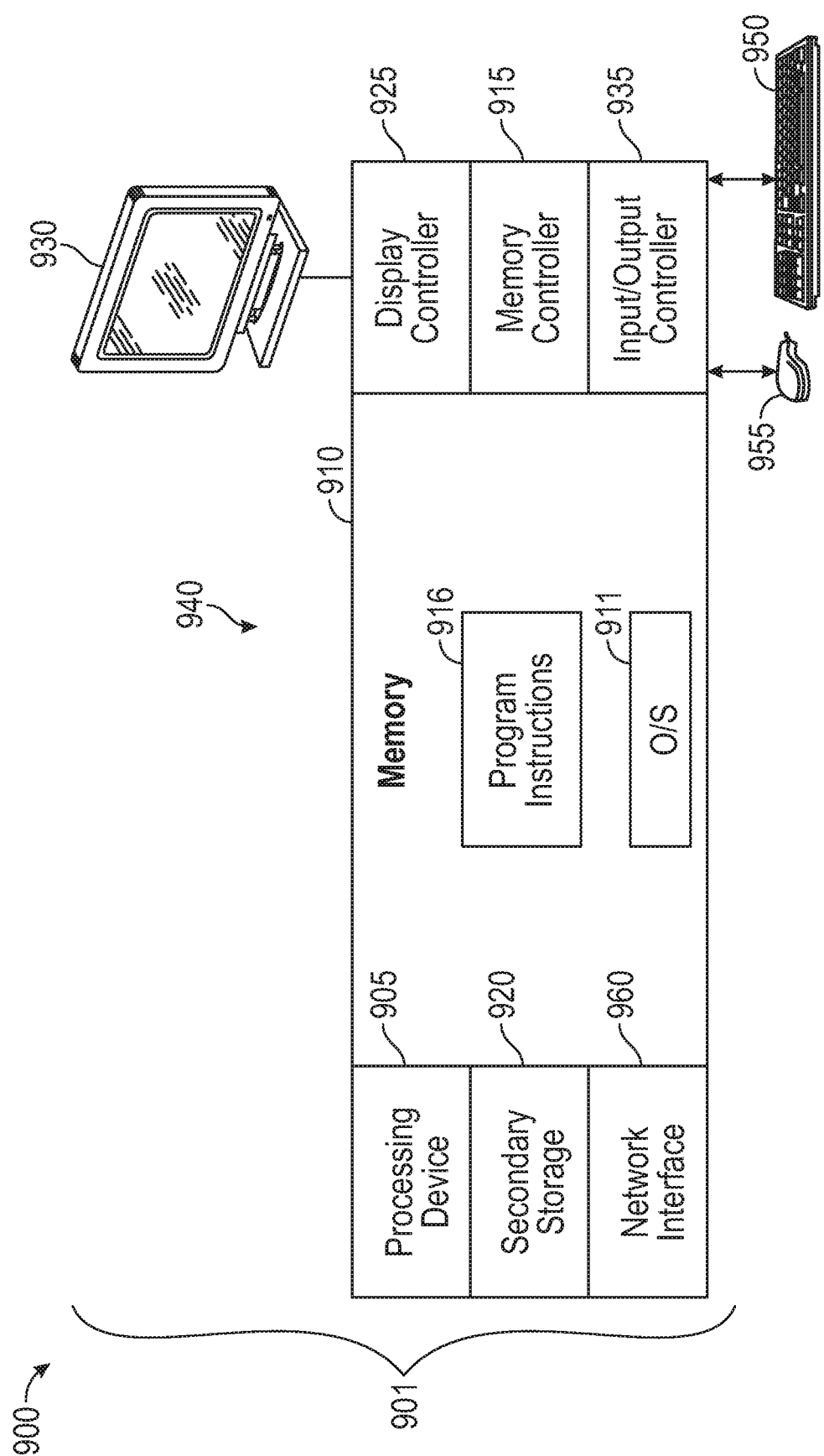
FIG. 9 is a schematic illustration of a computer system in accordance with one or more embodiments of the present invention.

Turning now to FIG. 9, a schematic illustration of a system 900 is depicted upon which aspects of one or more embodiments of providing individual bug fixed messages for software users may be implemented. In an embodiment, all or a portion of the system 900 may be incorporated into one or more of the 3D scanner device and processors described herein. In one or more exemplary embodiments, in terms of hardware architecture, as shown in FIG. 9, the computer 901 includes a processing device 905 and a memory 910 coupled to a memory controller 915 and an input/output controller 935. The input/output controller 935 can be, for example, but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the computer 901 may include address, control, and/or data connections to enable appropriate communications among the aforementioned components.

In one or more exemplary embodiments, a keyboard 950 and mouse 955 or similar devices can be coupled to the input/output controller 935. Alternatively, input may be received via a touch-sensitive or motion sensitive interface (not depicted). The computer 901 can further include a display controller 925 coupled to a display 930.

The processing device 905 is a hardware device for executing software, particularly software stored in secondary storage 920 or memory 910. The processing device 905 can be any custom made or commercially available computer processor, a central processing unit (CPU), an auxiliary processor among several processors associated with the computer 901, a semiconductor-based microprocessor (in the form of a microchip or chip set), a macro-processor, or generally any device for executing instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 910 may incorporate electronic, magnetic, optical, and/or other types of storage media. Accordingly, the memory 910 is an example of a tangible computer readable storage medium 940 upon which instructions executable by the processing device 905 may be embodied as a computer program product. The memory 910 can have a distributed architecture, where various components are situated remote from one another, but can be accessed by the processing device 905.

The instructions in memory 910 may include one or more separate programs, each of which comprises an ordered listing of executable instructions for implementing logical functions. In the example of FIG. 9, the instructions in the memory 910 include a suitable operating system (OS) 911 and program instructions 916. The operating system 911 essentially controls the execution of other computer programs and provides scheduling, input-output control, file and data management, memory management, and communication control and related services. When the computer 901 is in operation, the processing device 905 is configured to execute instructions stored within the memory 910, to communicate data to and from the memory 910, and to generally control operations of the computer 901 pursuant to the instructions. Examples of program instructions 916 can include instructions to implement the processing described herein in reference to FIGS. 1-8.

The computer 901 of FIG. 9 also includes a network interface 960 that can establish communication channels with one or more other computer systems via one or more network links. The network interface 960 can support wired and/or wireless communication protocols known in the art. For example, when embodied in a user system, the network interface 960 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, GPU devices, computing devices, microcontrollers, digital signal processors, or like devices, as further described herein. A CPU typically performs a variety of tasks while a GPU is optimized to display images.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A method for reporting errors in software, the method comprising:
    determining an occurrence of an error in software executing on a user processor;
    storing, in a memory accessible by the user processor, a unique error report identifier;
    reporting the error, the reporting comprising transmitting the unique error report identifier and error data that describes the error to a developer server, wherein the unique error report identifier is a session identifier of a session between the user processor and the developer server at the time that the error occurred;
    analyzing the error data to determine a fix to correct the error;
    storing a message regarding the fix to correct the error and the unique error report identifier in a fixed error database;
    launching the software and determining that the error was previously reported;
    querying, by the software, the fixed error database with the unique error report identifier to locate the message; and
    based on locating the message, downloading and displaying the message on the user processor, the downloading and displaying performed by the user processor.

2. The method of claim 1, wherein the error data is anonymized to remove data that identifies a user reporting the error.

3. The method of claim 1, wherein the fix is a software update and the method further comprises, based on locating the message, downloading and installing the software update at the user processor.

4. The method of claim 1, wherein the determining that the error was previously reported comprises locating the unique error report identifier in the memory accessible by the user processor.

5. The method of claim 1, wherein the error data includes a recorded state of the working memory of the user processor at the time that the error occurred.

6. The method of claim 1, wherein the software is scan processing software and the user processor is located on a laser scanner.

7. A method for reporting errors in software, the method comprising:
    determining an occurrence of an error in software executing on a user processor;
    storing, in a memory accessible by the user processor, a unique error report identifier;
    reporting the error, the reporting comprising transmitting the unique error report identifier and error data that describes the error to a developer server, wherein the error data is anonymized to remove data that identifies a user reporting the error;
    launching the software and determining that the error was previously reported;
    querying, by the software, a fixed error database with the unique error report identifier to locate a message regarding a fix to correct the error; and
    based on locating the message, downloading and displaying the message on the user processor, the downloading and displaying performed by the user processor.

8. The method of claim 7, wherein the unique error report identifier is a session identifier of a session between the user processor and the developer server at the time that the error occurred.

9. The method of claim 7, wherein the fix is a software update and the method further comprises, based on locating the message, downloading and installing the software update at the user processor.

10. The method of claim 7, wherein the determining that the error was previously reported comprises locating the unique error report identifier in the memory accessible by the user processor.

11. The method of claim 7, wherein the error data includes a recorded state of the working memory of the user processor at the time that the error occurred.

12. The method of claim 7, wherein the software is scan processing software and the user processor is located on a laser scanner.

13. A method for reporting errors in software, the method comprising:
- receiving an error report at a developer server, the receiving from a user processor executing software, the error report comprising a unique error report identifier and error data that describes an error in the software;
- analyzing the error data to determine a fix to correct the error; and
- storing a message regarding the fix to correct the error and the unique error report identifier in a fixed error database, the message accessible by the user processor in response to a query from the user processor that specifies the unique error report identifier, wherein the fix is a software update and the message describes how to download and install the software update at the user processor.

14. The method of claim 13, wherein the unique error report identifier is a session identifier of a session between the user processor and the developer server at the time that the error occurred.

15. The method of claim 13, wherein the error data is anonymized to remove data that identifies a user reporting the error.

16. The method of claim 13, wherein the error data includes a recorded state of the working memory of the user processor at the time that the error occurred.

17. The method of claim 13, wherein the software is scan processing software and the user processor is located on a laser scanner.

* * * * *